May 8, 1945.   J. R. RICHER   2,375,249
CAP SCREW
Filed Dec. 18, 1943
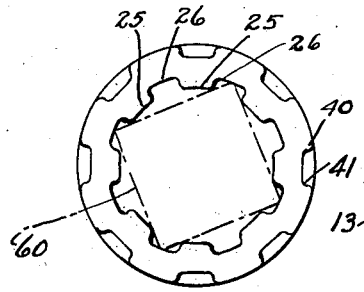
Fig. 1
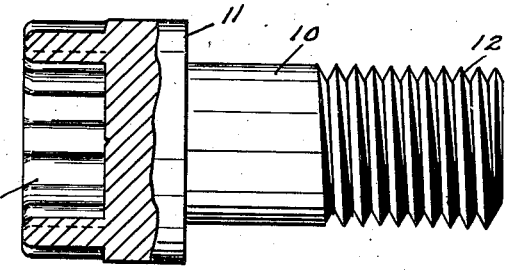
Fig. 2
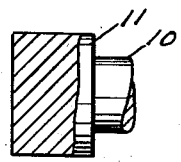
Fig. 3
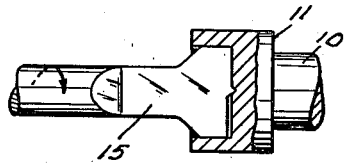
Fig. 4
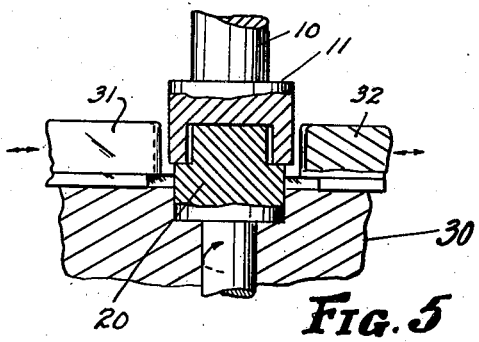
Fig. 5
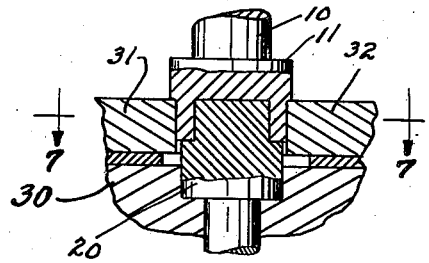
Fig. 6
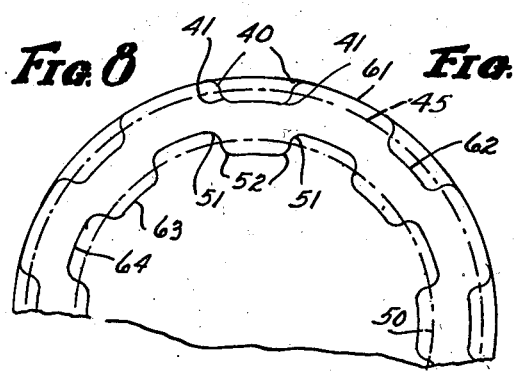
Fig. 8   Fig. 7
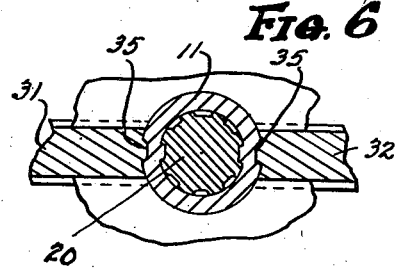
INVENTOR.
JOSEPH R. RICHER
BY
Bates, Teare, y M?Bean
ATTORNEYS Patented May 8, 1945

2,375,249

UNITED STATES PATENT OFFICE 2,375,249

CAP SCREW

Joseph R. Richer, Cleveland, Ohio

Application December 18, 1943, Serial No. 514,762

2 Claims. (Cl. 85—45)

This invention relates to an improvement in a socket sead cap screw and is particularly concerned with the construction of the socket, as well as the method of making the same.

Heretofore, the socket has been made either by an upsetting operation or by a broaching operation, where in each instance the force applied either for upsetting or broaching has extended axially of the screw. Such operations have not only been expensive to perform, but in addition have weakened the head of the screw to an objectionable degree.

An object of the present invention is to make a socket construction which is capable of coacting with wrench heads of different shape, but which will possess great mechanical strength and, therefore, resistance to fracture during the tightening operation. Moreover, the present invention contemplates a method of making the head so as to obtain alternating projections and depressions which constitute the wrench-engaging walls of the socket without subjecting the head to forces which tend to weaken the head. The method of the present invention tends to impart a toughness to the metal by a cold-working operation.

Referring now to the drawing, Fig. 1 is an end view of a cap screw embodying my invention; Fig. 2 is a side view of the cap screw with a portion thereof shown in section; Fig. 3 is a side view of part of a cap screw illustrating the blank from which the socket is to be formed; Fig. 4 illustrates a drilling operation as one of the steps in the formation of the socket; Fig. 5 is a vertical sectional view illustrating the drilled socket in position to apply the next step in the formation of the socket wall; Fig. 6 is a view similar to Fig. 5, but showing the completion of the step; Fig. 7 is a section taken on the line 7—7 in Fig. 6; and Fig. 8 is a diagrammatic view illustrating the relationship between the alternating projections and depressions.

In the various figures, the cap screw is shown as having a shank 10 and a head 11. The shank is threaded in the usual way, as at 12, while the head is provided with a socket indicated in general at 13. According to the present invention, the socket is made by taking a screw having a solid head as shown in Fig. 3 and forming a hole therein, as by drilling concentrically therewith and axially thereof to a depth of approximately ½ the height of the head, as is shown in Fig. 4, wherein the drill is indicated at 15. At the completion of the drilling operation, the head is inverted over a die 20 which has alternate projections and recesses therein corresponding to those indicated at 25 and 26 in the socket wall of Fig. 1. The die is rotatably mounted in a support 30 upon which diametrically opposed pressure heads 31 and 32 are mounted for movement radially of the die. Each pressure head has a projection 35 thereon which corresponds in depth to the depth of the projections 25 on the die, as is shown in Fig. 6, so that as the pressure heads are brought into engagement with the cap screw head, and as pressure is exerted thereon progressively until the metal of the cap screw head is deformed as far as the die and pressure heads will allow it to move, there is formed a pair of diametrically opposed radially aligned projections on the inner wall and recesses in the outer surface of the head of the cap screw. Thereupon, the pressure head members 31, 32 are retracted, and the cap screw and die are rotated for receiving an adjacent impression and then the operation is repeated.

In the socket illustrated in Fig. 1, there are four diametrically opposed pairs of aligned depressions and projections so that this particular socket could be formed by means of four pressing operations, it being understood that the cap is turned 45° between each operation.

The extent of the deformation of the metal, according to the present invention, is such that the projection inwardly of the cavity wall is equal in depth to the depression in the outer wall of the head, and is such that there are no abrupt corners either on the projections or on the depressions. To accomplish this, I so construct the die and pressure heads that the corners of the projections on the outer wall are curved, as at 40, while the corners on the depression in the outer wall are covered, as at 41, the curves meeting on a tangent which is normal to a circle 45 that is the loci of points for the centers about which the respective arcs 40 and 41 are drawn. The circle 45 lies midway between the outer surfaces of the projections and the inner surfaces of the depressions in the outer wall of the head. Similarly, a circle 50 which lies midway between the surfaces which define the projections and cavities of the socket wall constitutes a loci of points for the centers of circular arcs 51 and 52 which define the corners of the depressions and projections respectively on the socket wall. The spaces between the curved portions indicated at 61 and 62 on the outer wall and at 63 and 64 on the inner wall comprise lands in the form of circular segments, all of which have a center that is coincident with the axis of the screw.

An advantage of a socket made according to the present invention is the fact that the alternating projections and recesses can be readily formed in the socket head, wherefore the cost of manufacture can be materially lessened over methods of manufacture heretofore used for the same purpose. Additionally, that portion of the head which forms the socket is materially strengthened by the cold working operation and, therefore, is more resistant to fracture during the tightening operation. The socket thus formed is well adapted for use either with a wrench having a head shaped similarly to the contours of the socket wall, or having a square cross section, as shown by the broken lines 60 in Fig. 1.

I claim:

1. A socket cap screw head having outer and inner walls therein, each wall having alternating projections and indentations spaced equally thereon, the indentations on each surface being in radial alignment with the projections on the other surface, each projection and indentation having rounded corners, the radius of each curve being equal to half the depth of the indentation, whereby the curve on each projection merges with the curve on the associated indentation, and whereby the intermediate portion of each projection and indentation constitutes a land which embodies a circular segment having its center coincident with the axis of the screw.

2. A socket cap screw head having outer and inner walls therein, each wall having alternating projections and indentations spaced equally thereon, the indentations on each surface being in radial alignment with the projections on the other surface, each projection and indentation having rounded corners and the intermediate portion of each projection and indentation constituting a land which embodies a circular segment having its center coincident with the axis of the screw.

JOSEPH R. RICHER.